Patented Nov. 17, 1942

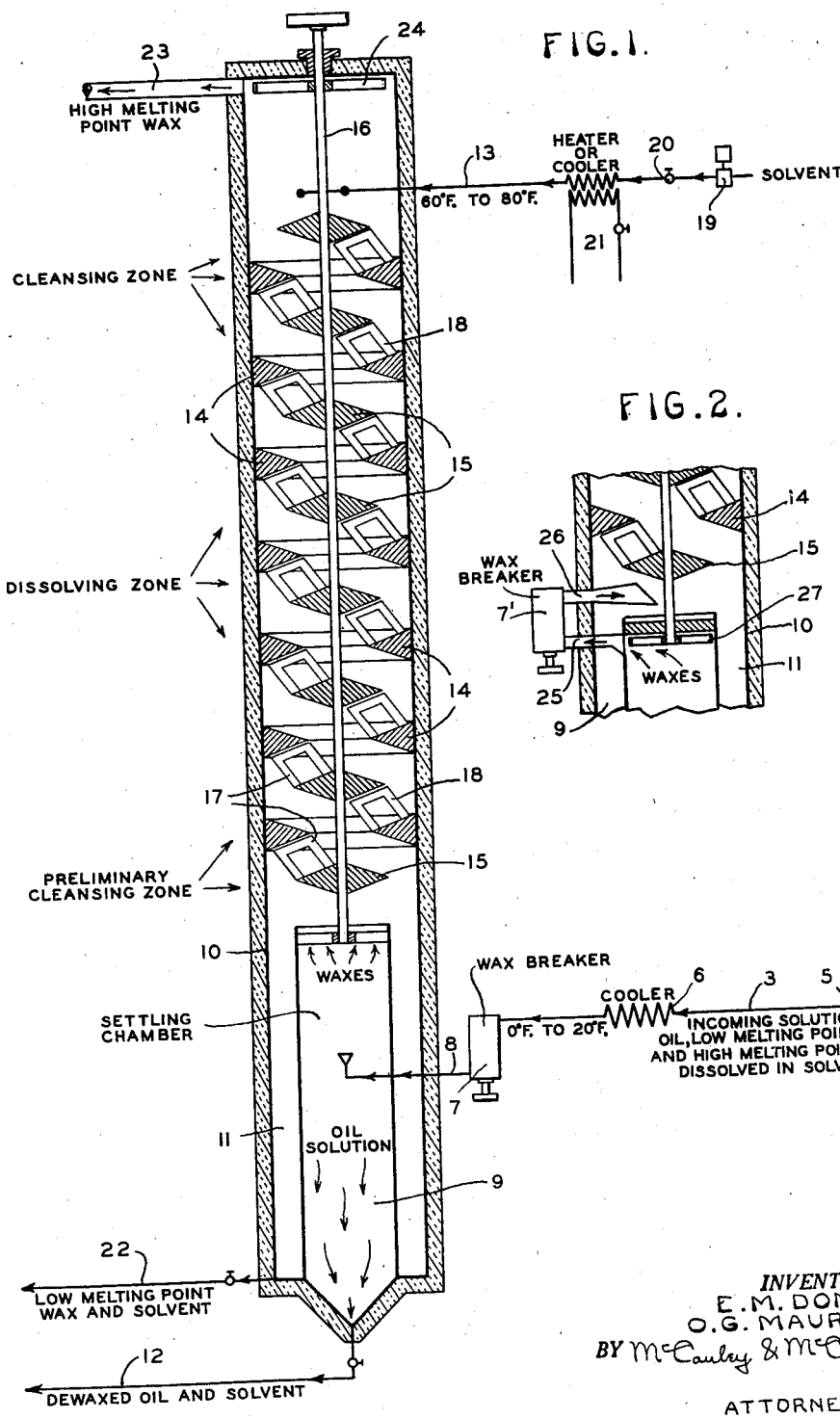

2,302,431

UNITED STATES PATENT OFFICE 2,302,431

APPARATUS FOR SEPARATING WAXES

Eddie M. Dons and Oswald G. Mauro, Tulsa, Okla., assignors to Mid-Continent Petroleum Corporation, Tulsa, Okla., a corporation of Delaware Application December 26, 1941, Serial No. 424,396

7 Claims. (Cl. 196—18)

This invention relates to apparatus for separating waxes having different melting points. The novel conditions may be employed to separate slack wax, or petrolatum, into high melting point wax, low melting point wax, and oil. However, the wax-separating conditions can be utilized to separate various other kinds of high and low melting point waxes either with, or without, a recovery of oil as a separate product. In the preferred form of the invention, the valuable high melting point wax is preferably isolated from the low melting point waxes, and subjected to a refining or purifying operation which positively removes contaminating low melting point fractions from solidified particles of the high melting point wax.

An object of the invention is to produce a commercially feasible system which eliminates cumbersome and expensive operations heretofore involved in the separation of waxes. A further object is to produce a very simple unitary continuous system consisting of a novel combination of conditions which cooperate with each other to effectively accomplish the results of more expensive separate sets of equipment heretofore employed in the successive steps of separating and refining waxes.

More specifically stated, an object is to produce a simple counterflow extraction system wherein a relatively warm solvent flows through a mixture of high and low melting point wax particles, so as to selectively dissolve the low melting point waxes without dissolving the high melting point waxes. A very desirable form of the invention includes means for deflecting the solvent and wax particles into intersecting paths in a relatively warm dissolving zone to effectively dissolve low melting point waxes in the solvent stream, and thereafter deflecting the high melting point wax particles across the paths of warmer solvent in a cleansing zone, so as to forcibly scrub dissolved low melting point wax from surfaces of the deflected high melting point wax particles.

Another cooperative detail of the new process includes a device for forcibly disintegrating the solidified mixture of waxes to positively release trapped liquid solution from the solidified wax, at the same time providing for highly efficient selection of low melting point fractions in the dissolving zone, and similar efficiency in the cleansing zone where dissolved low melting point waxes are scrubbed from the high melting point wax particles.

With the foregoing and other objects in view, the invention comprises the novel combination and arrangement of cooperative details hereinafter specifically described to illustrate one form of the invention. However, it is to be understood that the scope of this patent extends to modifications and variations described by terms employed in the claims hereunto appended.

Fig. 1 is a diagrammatical view of a wax-separating system embodying features of this invention.

Fig. 2 is a fragmentary vertical section showing a wax-breaker, or disintegrator, in the course of waxes passing from a settling zone to a counterflow extraction system.

In separating slack wax, petrolatum and other stocks containing high melting point waxes, low melting point waxes and oil, the charging stock is preferably dissolved in a suitable selective solvent and then cooled to solidify the waxes in the liquid solution. For example, the stock known as slack wax, consisting of high and low melting point waxes and oil, may be dissolved in a relatively heavy solvent, and a continuous stream of the resultant solution may be admitted through the intake pipe 3, said intake being provided with a pump 4 and a valve 5 to regulate the continuous incoming stream.

This incoming stream flows through a chiller, or cooler, 6 where the flowing solution is cooled to a temperature desired for precipitation of waxes therein. The drawing indicates that this temperature may range between 0° F. and 20° F., and other temperature conditions are shown in Fig. 1. However, these specific temperatures are merely for convenience in illustrating the importance of variations in the temperature conditions at different zones, and it is to be understood that the selected temperatures will depend upon the nature of the charging stock, the solvents, and the conditions desired in the different zones. The invention is not limited to the illustrative temperatures herein mentioned.

However, the temperature at the cooler 6 is low enough to precipitate or solidify the waxes in the liquid solution. This operation occludes, or traps, some of the oil solution in clusters of the wax crystals. One of our objects is to separate oil from the waxes. Therefore the mixture of oil solution and solidified waxes is preferably transmitted from the cooler 6 to a breaker, or disintegrator, 7 where the wax is forcibly broken into minute particles in the cooled oil solution. The trapped oil solution is thus liberated from the wax, and the mixture of oil solution and fine wax particles is in excellent condition for the subsequent operations.

An inlet pipe 8 conducts a continuous stream of the oil solution and disintegrated wax particles into a settling chamber 9 surrounded by the lower portion of a separating chamber 10. This chamber 10 may be in the form of an upright column covered with insulation. Its lower portion may be separated from and concentric with the inner settling chamber 9, so as to form an annular settling chamber 11 around said inner chamber. In this form of the invention, the settling compartments 9 and 11 provide a pair of settling zones immediately below and in free communication with a counterflow system hereafter described.

The incoming stream of chilled solution and free wax particles may be delivered from the pipe 8 to the settling chamber 9 at approximately the temperature selected for precipitation of wax in the cooler, or chiller, 6, and we prefer to insulate the outer column 10, so as to maintain predetermined extracting and cleansing temperatures therein.

We are now assuming that a relatively dense or heavy solvent has been selected for this operation, and that the viscosity and interfacial tension are low enough to allow the wax particles to freely rise in the heavy solution. In this event, the major portion of the heavy solution will freely move downwardly by gravity to the bottom of the settling chamber 9 where it is discharged through a pipe 12. This outgoing solution is free of wax and it may be distilled in any suitable manner to remove the solvent from the dewaxed oil. It will be observed that most of the oil is very easily, quickly and economically dewaxed in the simple settling chamber 9, and immediately discharged from the dewaxing system. A low pour point oil is thus recovered as a separate product from the waxy mixture, and in a typical slack wax, this valuable oil may be about 30 per cent of the original waxy mixture.

Attention is now directed to the settling zone established near the point where the incoming mixture of solvent and wax from pipe 8 enters the settling chamber 9. The mass of high and low melting point wax particles move upwardly and carry with them minor portions of the solution, including oily films around the wax particles and relatively free portions of the solution between the rising wax particles. However, this rising mass moves through the open top of the settling chamber 9 and passes through a relatively heavy descending stream which may be produced by continuously introducing a stream of solvent through a pipe 13 leading into the upper portion of the column 10.

In this form of the invention, the stream of cleansing solvent will freely descend in direct contact with the rising stream of wax particles, so as to dissolve the free portions of solution carried by the wax, and also forcibly scrub liquid films from the rising wax particles. If the temperature is high enough, the solvent will also melt and dissolve the low melting point wax fractions. These functions may be aided by any suitable wax-deflectors. For example, the counterflow system may be provided with a series of alternating baffles arranged at successive elevations. The baffles shown in Fig. 1 include a series of rings 14 extending inwardly from the inner face of the column 10 and a series of central baffle members 15 arranged as shown in the drawing to produce an elongated tortuous passageway wherein the rising wax particles move back and forth in a zigzag course. The stream of solvent descends through the rising stream of wax particles, and the counterflowing streams are divided into numerous layers of different specific gravities contacting with each other and advancing in intersecting paths as they flow from one baffle to another. These baffles are preferably provided with upwardly inclined bottom faces to permit free upward movement of the rising wax particles. It will be observed that the rising layers of wax particles move upwardly while in contact with the upwardly inclined bottom faces, and that said layers of wax particles intersect the descending solvent while rising from one upwardly inclined plane to another.

This feature tends to prevent the wax particles from clinging to the baffles. However, any suitable mechanical means may be employed to prevent or limit the growing of wax crystals which might otherwise extend from the bottom faces of the baffles. For example, the central baffles 15 may be fixed to a rotary shaft 16, so as to rotate with the shaft at a very low speed, and scrapers 17 may extend from the top faces of these rotary baffles to remove waxy material from the bottoms of the stationary baffle rings 14. These stationary baffles 14 may be likewise provided with scrapers 18 extending from their top faces to remove waxy material from the bottom faces of the slowly rotating baffles. In each case, the scrapers extend from the top of one baffle to a point adjacent to the bottom of the next higher baffle. It is not necessary to forcibly scrape the baffles, the object being to limit the thickness of any wax deposit tending to grow on the baffles, thereby eliminating obstructions that would tend to prevent free continuous flow of the wax and solvent.

Attention is now directed to certain conditions of the solvent stream introduced through the pipe 13. This pipe is equipped with a pump 19 and a valve 20 to deliver continuous regulated stream of the solvent, and a variable heater or cooler 21 to regulate the temperature of the solvent stream. For example, in separating slack waxes, this solvent stream may enter the top of the counterflow system at a selected temperature ranging between about 60° F. to about 80° F., while the waxy mixture enters the settling chamber 9 at a selected temperature between about 0° F. and 20° F. Therefore, the temperature of the descending solvent stream is gradually decreased as it transfers heat to the rising wax particles.

Without attempting to point out the exact temperature at any given point in the counterflow system, we will state that the solvent stream from pipe 13 is warm enough to dissolve the low melting point waxes without dissolving the high melting point wax. The solvent stream descends through a series of different temperature zones and performs successive functions in the several zones, as will be presently described. The resultant descending solution is diverted from the top of the settling chamber 9 to the surrounding chamber 11, from which it is discharged through a pipe 22. This deflection of the descending solution is due partly to the upward force of the rising stream of wax particles issuing from the top of the settling chamber 9, and partly to the free path for the descending current in the chamber 11. The lowermost central baffle 15 also tends to deflect the descending stream toward the outer chamber 11. Some of the wax particles may be swept into the outer settling chamber 11, but these wax particles are so light that they will eventually rise in the heavy solvent and return to the mass of wax, instead of passing to the bottom of said chamber 11.

The wax particles from the top of the settling chamber 9 enter into the lower portion of the counterflow system, and carry with them a minor portion of the oil solution in the form of oily films around the wax particles and some free solution between said particles. The incoming mass is subjected to a preliminary warming and cleansing operation in the lower portion of the counterflow system, where the rising waxy material is repeatedly deflected into and across the paths of the relatively warm solvent, thereby producing intimate forcible contacts between the solvent and wax particles, so as to dissolve the oily material in the outgoing solvent. Therefore, the lower portion of the counterflow system may be termed a preliminary cleansing zone, wherein oily material is removed from the wax particles to the counterflowing solvent.

As the wax particles rise in the counterflow system they enter into a warmer dissolving zone where the temperature of the descending solvent is high enough to melt and selectively dissolve the low melting point wax fractions, without dissolving the high melting point particles.

Thereafter, the high melting point wax particles rise through a still warmer cleansing zone where the fresh incoming solvent scrubs minor portions of dissolved low melting point waxes from the high melting point wax particles.

The forcibly cleansed high melting point wax particles then pass through a final cleansing zone to a wax outlet 23 above the counterflow system, where an impeller 24 on the slowly rotating shaft 16 directs the outgoing wax toward said outlet 23. This final cleansing zone contains a body of fresh solvent which will tend to dissolve and remove any of the heavy solution that may be carried by the light wax particles.

The sequence of cooperative operations herein disclosed include the following:

Disintegrating the wax

When wax is precipitated, or solidified, in a cooled solution, the individual wax crystals coalesce in the form of clusters, with portions of the solution trapped, or occluded in the clusters. This trapped solution is positively liberated in the disintegrator 7, which forcibly breaks the waxes into fine solid particles.

The settling operation

The simple settling operation in chamber 9 causes the dissolved oil to separate from the high and low melting point wax particles. This desirable quiescent settling is not disturbed by the descending solvent stream in the counterflow system. Since the descending solvent stream is diverted into the outer settling chamber 11, it does contaminate the outgoing dewaxed solution in pipe 12, and it permits free return of wax particles that may be carried into said settling chamber 11. The product of the simple settling in chamber 11 is a valuable dewaxed oil having a low pour point.

The preliminary cleansing zone

A minor portion of the oil solution will be carried with the wax particles passing from the settling chamber 9 to the counterflow extraction system. This oil solution is immediately subjected to the forcible cleansing and dissolving action of the relatively warm solvent stream descending through the lower portion of the counterflow system, so as to subject the wax particles to a cleansing action before they reach the dissolving zone.

The dissolving zone

The cooperative conditions in the dissolving zone include the temperature high enough to selectively dissolve the low melting point wax fractions, without dissolving the high melting point wax particles, and the manner in which the previously disintegrated wax is exposed to the relatively warm solvent. The high efficiency of this operation is due to the means for spreading the stream of wax particles in said dissolving zone to separate and distribute the high and low melting point wax particles in the counterflowing solvent stream, while repeatedly deflecting the distributed wax particles and solvent stream into intersecting paths, so as to quickly and positively dissolve the selected low melting point waxes in the warmer solvent.

The warmer cleansing zone

The undissolved high melting point wax particles are subjected to refining or purifying operation in the still warmer cleansing zone at the upper portion of the counterflow system, where the series of deflectors act upon the stream of wax particles to distribute the high melting point fractions in the fresh, warm solvent, while repeatedly deflecting the distributed wax particles and fresh solvent into intersecting paths, so as to forcibly scrub dissolved low melting point wax from surfaces of the deflected high melting point wax particles. Under these conditions, the fresh incoming solvent at a relatively high temperature, will quickly cleanse or purify the valuable high melting point wax fractions.

A continuous stream of the cleansed high melting point wax is discharged through the outlet 23, while a stream of the dissolved low melting point wax is discharged through the pipe 22, the dewaxed oil being discharged through the pipe 12.

It will be observed that the step of breaking the wax is a desirable cooperative detail having an effect at each of the successive stages, beginning at the settling chamber 9 where the free oil solution is separated from the broken wax particles, and continuing through the successive zones in the counterflow system, where the disintegrated wax particles are most effectively subjected to the selective dissolving and cleansing operations.

Fig. 2 illustrates a wax breaker, or disintegrator, 7' located in the course of the deoiled wax particles passing from the settling chamber 9 to the counterflow system. In Fig. 2 the upper portion of the chamber 9 is closed and provided with a wax outlet 25 leading to the disintegrator 7', the latter having an outlet 26 through which the disintegrator wax particles are discharged into the counterflow system. A rotary impeller 27 in Fig. 2 will tend to deflect the wax into the outlet 25.

In actual practices we have found that the wax particles tend to coalesce in a settling zone, and that a wax-breaker arranged near the entrance of the counterflow system will have the advantage of forcibly disintegrating the masses of wax for most effective distribution, scrubbing and selective dissolving in the counterflow system.

It is to be understood the relatively broad aspect of the invention are not limited to details of the specific arrangement of chambers and zones herein disclosed, and that any suitable light or heavy solvents may be employed to produce the counterflow of wax and solvent. However, as an illustration of heavy solvent compositions selected for this invention, we will state that various compositions including methylene dichloride are desirable. More specifically stated, in separating slack wax, such compositions may consist of 75 percent methylene dichloride and 25 percent dichlorethyl ether; or 75 percent methylene dichloride and 25 percent sulfur dioxide.

Examples of other heavy solvent compositions include dichlorodifluoromethane and sulfur dioxide; perchlorethylene and sulfur dioxide; perchlorethylene and dichlorethyl ether.

We claim:

1. In an apparatus for separating oil and waxes, a cooler wherein a liquid solution of the oil and waxes is cooled to solidify high and low melting point waxes in a liquid solution of oil and solvent, releasing means wherein liquid oil solution is released from the solidified waxes, said releasing means including a settling chamber having an inlet communicating with said cooler to receive a mixture of liquid oil solution and solidified waxes, said settling chamber also having an outlet for the dewaxed solution lower than said inlet to provide for the discharge of relatively heavy dewaxed solution, wax-separating means comprising a counterflow extraction system having a relatively warm dissolving zone communicating with the upper portion of said settling chamber to receive a stream of wax particles from the settling chamber, and a still warmer cleansing zone communicating with the upper portion of said dissolving zone to receive a stream of solidified high melting point wax particles from said dissolving zone, means for introducing a continuous descending stream of relatively heavy wax solvent into said cleansing zone so as to maintain a counterflow of descending solvent and rising wax particles in said cleansing and dissolving zones, means for regulating the temperatures of said solvent stream to maintain said dissolving zone at predetermined temperatures high enough to melt and dissolve the low melting point wax particles without dissolving the high melting point wax particles, and a series of wax-deflectors arranged at successive elevations in said dissolving and cleansing zones to repeatedly deflect the rising wax particles across paths of descending solvent, thereby selectively dissolving low melting point wax in the descending solvent stream and scrubbing dissolved low melting point wax from surfaces of the deflected high melting point wax particles in said warmer cleansing zone, the lower portion of said dissolving zone having an outlet for the dissolved low melting point wax, and the upper portion of said cleansing zone being provided with an outlet for the cleansed high melting point wax.

2. In an apparatus for separating oil and waxes, a cooler wherein a liquid solution of the oil and waxes is cooled to solidify high and low melting point waxes in a liquid solution of oil and solvent, releasing means wherein liquid oil solution is released from the solidified waxes, said releasing means including a settling chamber having an inlet communicating with said cooler to receive a mixture of liquid oil solution and solidified waxes, said settling chamber also having an outlet for the dewaxed solution lower than said inlet to provide for the discharge of relatively heavy dewaxed solution, wax-separating means comprising a counterflow extraction system having a relatively warm dissolving zone communicating with the upper portion of said settling chamber to receive a stream of wax particles from the settling chamber, and a still warmer cleansing zone communicating with the upper portion of said dissolving zone to receive a stream of solidified high melting point wax particles from said dissolving zone, means for introducing a continuous descending stream of relatively heavy wax solvent into said cleansing zone so as to maintain a counterflow of descending solvent and rising wax particles in said cleansing and dissolving zones, means for regulating the temperatures of said solvent stream to maintain said dissolving zone at predetermined temperatures high enough to melt and dissolve the low melting point wax particles without dissolving the high melting point wax particles, and a series of wax-deflectors arranged at successive elevations in said dissolving and cleansing zones to repeatedly deflect the rising wax particles across paths of descending solvent, thereby selectively dissolving low melting point wax in the descending solvent stream and scrubbing dissolved low melting point wax from surfaces of the deflected high melting point wax particles in said warmer cleansing zone, said wax-deflectors comprising alternating baffles having top faces exposed to the descending solvent stream and bottom faces to receive the rising stream of wax particles, the lower portion of said dissolving zone having an outlet for the dissolved low melting point wax, and the upper portion of said cleansing zone being provided with an outlet for the cleansed high melting point wax.

3. In an apparatus for separating oil and waxes, a cooler wherein a liquid solution of the oil and waxes is cooled to solidify high and low melting point waxes in a liquid solution of oil and solvent, releasing means including a wax-disintegrator to forcibly disintegrate the high and low melting point waxes, wax-separating means comprising a counterflow extraction system having a relatively warm dissolving zone communicating with said wax-disintegrator to receive a stream of disintegrated high and low melting point wax particles, and a still warmer cleansing zone communicating with the upper portion of said dissolving zone to receive a stream of the disintegrated high melting point wax particles from said dissolving zone, means for introducing a continuous descending stream of relatively heavy wax solvent into said cleansing zone so as to maintain a counterflow of descending solvent and rising wax particles in said cleansing and dissolving zones, means for regulating the temperatures of said solvent stream to maintain said dissolving zone at predetermined temperatures high enough to melt and dissolve the low melting point wax particles without dissolving the high melting point wax particles, and means for deflecting the counterflowing streams of solvent and wax particles into intersecting paths in said dissolving and cleansing zones, so as to selectively dissolve low melting point waxes in the descending solvent stream and thereafter scrub dissolved low melting point wax from surfaces of the deflected high melting point wax particles in said warmer cleansing zone, the lower portion of said dissolving zone having an outlet for the dissolved low melting point wax, and the upper portion of said cleansing zone being provided with an outlet for the cleansed high melting point wax.

4. In an apparatus for separating oil and waxes, a cooler wherein a liquid solution of the oil and waxes is cooled to solidify high and low melting point waxes in a liquid solution of oil and solvent, releasing means wherein liquid oil solution is released from the solidified waxes, said releasing means including a wax-disintegrator associated with said cooler to forcibly disintegrate the solidified high and low melting point waxes, thereby liberating trapped oil solution from the waxes, and a settling chamber having an inlet communicating with said disintegrator to receive a mixture of liquid oil solution and disintegrated wax particles, said settling chamber also having an outlet for the dewaxed solution lower than said inlet to provide for the discharge of relatively heavy dewaxed solution, wax-separating means comprising a counterflow extraction system having a relatively warm dissolving zone communicating with the upper portion of said settling chamber to receive a stream of said wax particles from the settling chamber, and a still warmer cleansing zone communicating with the upper portion of said dissolving zone to receive a stream of the disintegrated high melting point wax particles from said dissolving zone, means for introducing a continuous descending stream of relatively heavy wax solvent into said cleansing zone so as to maintain a counterflow of descending solvent and rising wax particles in said cleansing and dissolving zones, means for regulating the temperatures of said solvent stream to maintain said dissolving zone at predetermined temperatures high enough to melt and dissolve the low melting point wax particles without dissolving the high melting point wax particles, means for deflecting the counterflowing streams of solvent and wax particles into intersecting paths in said dissolving and cleansing zones, so as to dissolve low melting point wax in the descending solvent stream and thereafter scrub dissolved low melting point wax from surfaces of the deflected high melting point wax particles in said warmer cleansing zone, said deflecting means comprising alternating baffles having top faces exposed to the descending solvent stream and bottom faces to receive the rising stream of wax particles, the lower portion of said dissolving zone having an outlet for the dissolved low melting point wax, and the upper portion of said cleansing zone being provided with an outlet for the cleansed high melting point wax.

5. In an apparatus for separating oil and waxes, a cooler wherein a liquid solution of the oil and waxes is cooled to solidify high and low melting point waxes in a liquid solution of oil and solvent, releasing means wherein liquid oil solution is released from the solidified waxes, said releasing means including a settling chamber having an inlet communicating with said cooler to receive a mixture of liquid oil solution and solidified waxes, said settling chamber also having an outlet for the dewaxed solution lower than said inlet to provide for the discharge of relatively heavy dewaxed solution, wax-separating means comprising a counterflow extraction system having a relatively warm dissolving zone communicating with the upper portion of said settling chamber to receive a stream of wax particles from the settling chamber, and a still warmer cleaning zone communicating with the upper portion of said dissolving zone to receive a stream of solidified high melting point wax particles from said dissolving zone, means for introducing a continuous descending stream of relatively heavy wax solvent into said cleansing zone so as to maintain a counterflow of descending solvent and rising wax particles in said cleansing and dissolving zones, means for regulating the temperatures of said solvent stream to maintain said dissolving zone at predetermined temperatures high enough to melt and dissolve the low melting point wax particles without dissolving the high melting point wax particles, means for deflecting the counterflowing streams of solvent and wax particles into intersecting paths in said dissolving and cleansing zones, so as to dissolve low melting point wax in the descending solvent stream and thereafter scrub dissolved low melting point wax from surfaces of the deflected high melting point wax particles in said warmer cleansing zone, said deflecting means comprising alternating baffles having top faces exposed to the descending solvent stream and upwardly inclined bottom faces to receive upwardly inclined layers of the rising wax particles, the lower portion of said dissolving zone having an outlet for the dissolved low melting point wax, and the upper position of said cleansing zone being provided with an outlet for the cleansed high melting point wax.

6. In an apparatus for separating oil and waxes, a cooler wherein a liquid soltion of the oil and waxes is cooled to solidify high and low melting point waxes in a liquid solution of oil and solvent, releasing means wherein liquid oil solution is released from the solidified waxes, said releasing means including a settling chamber having an inlet communicating with said cooler to receive a mixture of liquid oil solution and solidified waxes, said settling chamber also having an outlet for the dewaxed solution lower than said inlet to provide for the discharge of relatively heavy dewaxed solution, wax-separating means comprising a counterflow extraction system having a relatively warm dissolving zone communicating with the upper portion of said settling chamber to receive a stream of wax particles from the settling chamber, and a still warmer cleansing zone communicating with the upper portion of said dissolving zone to receive a stream of solidified high melting point wax particles from said dissolving zone, a wax-disintegrator located in the course of the waxes between said settling chamber and relatively warm dissolving zone to forcibly disintegrate the high and low melting point waxes, means for introducing a continuous descending stream of relatively heavy wax solvent into said cleansing zone so as to maintain a counterflow of descending solvent and rising wax particles in said cleansing and dissolving zones, means for regulating the temperatures of said solvent stream to maintain said dissolving zone at predetermined temperatures high enough to melt and dissolve the low melting point wax particles without dissolving the high melting point wax particles, and a series of wax-deflectors arranged at successive elevations in said dissolving and cleansing zones to repeatedly deflect the rising wax particles across paths of descending solvent, thereby selectively dissolving low melting point wax in the descending solvent stream and scrubbing dissolved low melting point wax from surfaces of the deflected high melting point wax particles in said warmer cleansing zone, the lower portion of said dissolving zone having an outlet for the dissolved low melting point wax, and the upper portion of said cleansing zone being provided with an outlet for the cleansed high melting point wax.

7. In an apparatus for separating oil and waxes, a cooler wherein a liquid solution of the oil and waxes is cooled to solidify high and low melting point waxes in a liquid solution of oil and solvent, releasing means wherein liquid oil solution is released from the solidified waxes, said releasing means including a settling chamber having an inlet communicating with said cooler to receive a mixture of liquid oil solution and solidified waxes, said settling chamber also having an outlet for the dewaxed solution lower than said inlet to provide for the discharge of relatively heavy dewaxed solution, wax-separating means comprising a counterflow extraction system having a relatively warm dissolving zone communicating with the upper portion of said settling chamber to receive a stream of wax particles from the settling chamber, and a still warmer cleansing zone communicating with the upper portion of said dissolving zone to receive a stream of solidified high melting point wax particles from said dissolving zone, means for introducing a continuous descending stream of relatively heavy wax solvent into said cleansing zone so as to maintain a counterflow of descending solvent and rising wax particles in said cleansing and dissolving zones, means for regulating the temperatures of said solvent stream to maintain said dissolving zone at predetermined temperatures high enough to melt and dissolve the low melting point wax particles without dissolving the high melting point wax particles, means for deflecting the counterflowing streams of solvent and wax particles into intersecting paths in said dissolving and cleansing zones, so as to dissolve low melting point wax in the descending solvent stream and thereafter scrub dissolved low melting point wax from surfaces of the deflected high melting point wax particles in said warmer cleansing zone, said deflecting means comprising alternating baffles having top faces exposed to the descending solvent stream and bottom faces to receive layers of the rising wax particles, and scrapers located below and adjacent to said bottom faces to remove extended portions of wax deposited thereon, said dissolving zone having an outlet for the dissolved low melting point wax and said cleansing zone being provided with an outlet for the cleansed high melting point wax.

EDDIE M. DONS.
OSWALD G. MAURO.